June 17, 1930.    J. BLACKBURN    1,764,145
GEAR SHIFT
Filed Aug. 8, 1927    3 Sheets-Sheet 1
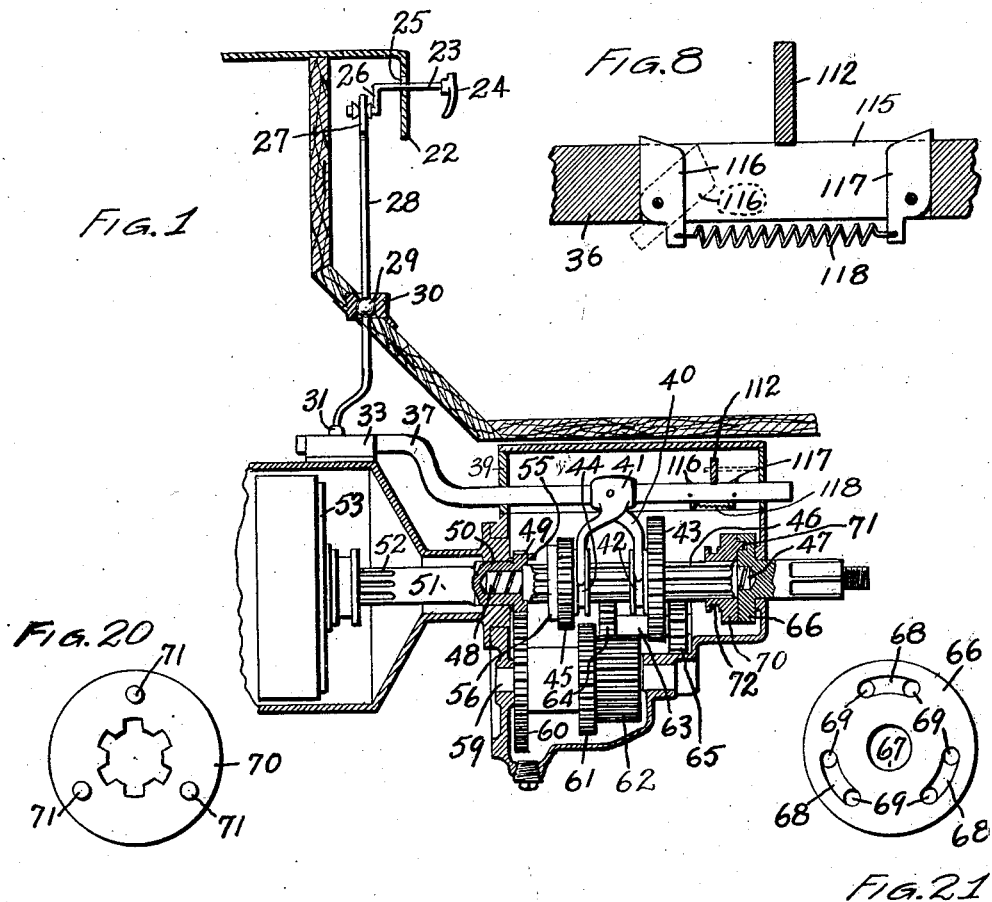
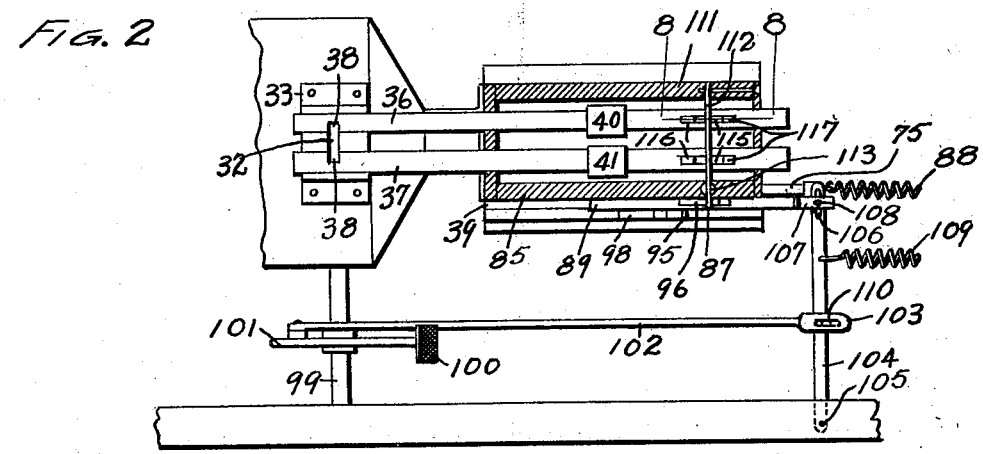
INVENTOR
JASPER BLACKBURN
By Edward E. Longan
ATTY.

June 17, 1930.  J. BLACKBURN  1,764,145
GEAR SHIFT
Filed Aug. 8, 1927  3 Sheets-Sheet 2
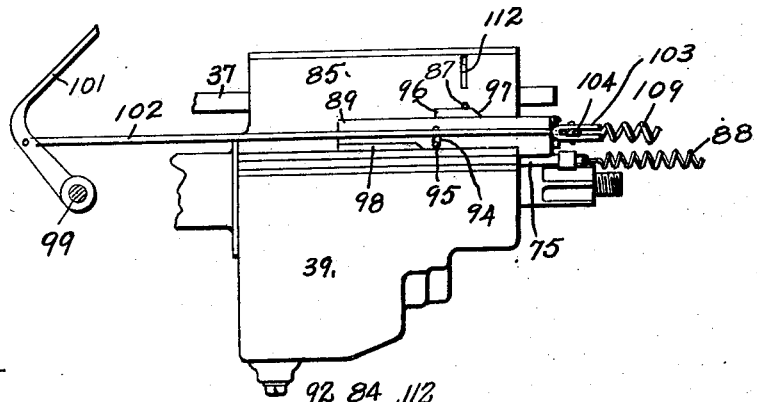
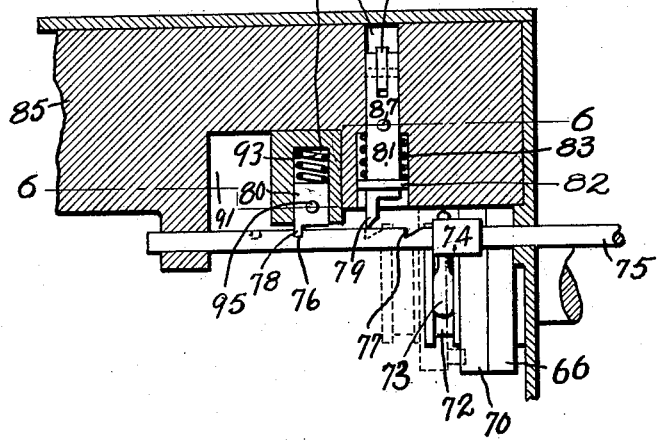
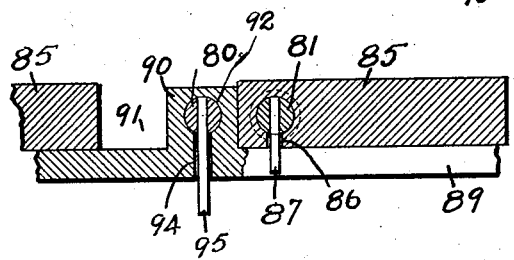
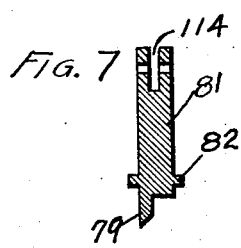
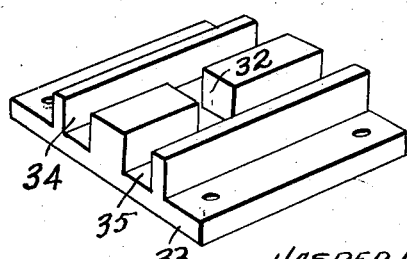
INVENTOR
JASPER BLACKBURN
BY Edward E. Lingan
ATTY.

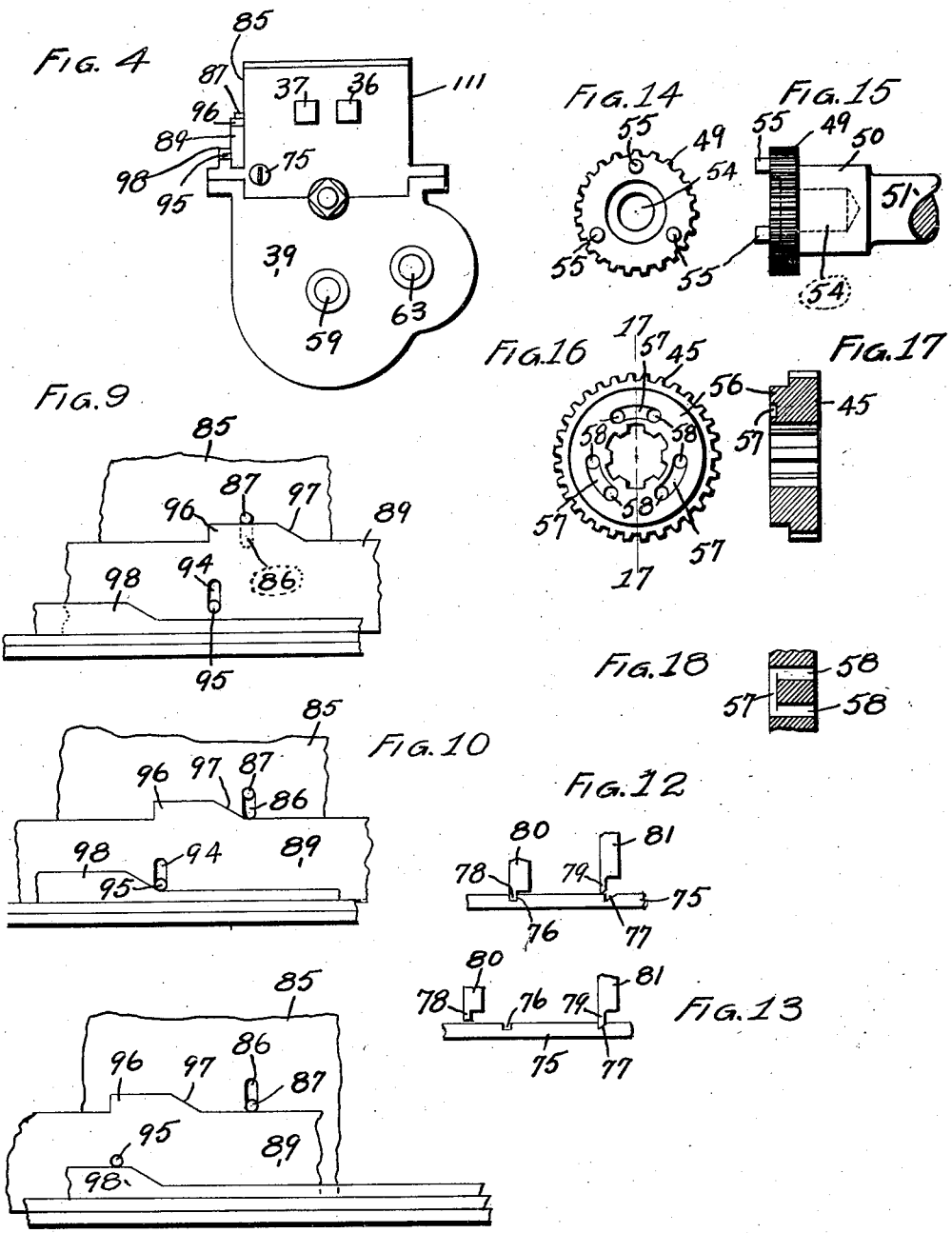

Patented June 17, 1930

1,764,145

UNITED STATES PATENT OFFICE

JASPER BLACKBURN, OF WEBSTER GROVES, MISSOURI

GEAR SHIFT

Application filed August 8, 1927. Serial No. 211,333.

My invention relates to improvements in gear shifts, and has for its primary object a gear shift or sliding transmission in which both ends of the transmission are disconnected so that the transmission will remain idle during the shifting of the gears.

A further object is to construct a gear shift in which a clutch is located at both ends of the sliding gear transmission and in which, during the shifting of the gears or at least a major portion thereof, both ends of the transmission are disconnected and in which the rear clutch will automatically be re-connected when the shifting is almost completed.

A still further object is to construct a sliding gear transmission having a clutch at each end in which the clutches are disconnected in sequence, i. e., the forward clutch is first disconnected and then the second or rear clutch disconnected; the rear clutch being held open until the shifting is partially completed and then automatically re-engaged.

In the drawings:—

Fig. 1 is a fragmental view of an automobile with my device attached thereto showing the transmission housing in section;

Fig. 2 is a top plan view with parts in section;

Fig. 3 is a side elevation of my device showing the manner of connecting the rear clutch to the operating mechanism of the forward clutch;

Fig. 4 is a rear view of the transmission housing and parts carried thereby;

Fig. 5 is an enlarged fragmental section showing the clutch operating rod and the dogs by which the same are controlled;

Fig. 6 is a section taken on the line 6—6 of Fig. 5;

Fig. 7 is a vertical section of the dog which holds the clutch in open position;

Fig. 8 is an enlarged section of one of the shifter bars taken on the line 8—8 of Fig. 2;

Fig. 9 is a diagrammatic view of a portion of the rear clutch operating mechanism showing the same in its starting position;

Fig. 10 is a similar view illustrating the position of the parts when the clutch is partially open;

Fig. 11 is a similar view illustrating the position of the various parts when the clutch is fully open and while being retained in open position;

Fig. 12 is a view of the clutch operating rod with the operating dog in position;

Fig. 13 is a similar view showing the other dog holding the clutch in open position;

Fig. 14 is a face view of the driving gear;

Fig. 15 is a side elevation of the same;

Fig. 16 is a face view of the intermediate and high speed gear;

Fig. 17 is a cross section taken on the line 17—17 of Fig. 16;

Fig. 18 is a diagrammatic sectional view through one of the pin slots illustrated in Fig. 16;

Fig. 19 is a perspective view on an enlarged scale of the plate in which the lower end of the shifter rod operates;

Fig. 20 is a face view of one of the rear clutch members; and

Fig. 21 a face view of the opposite rear clutch member.

In the construction of my device I employ an automobile which is provided with the usual instrument board 22. Through this board extends a rod 23 which has a handle 24 on its outer end. The rod 23 extends through the slot 25 which is slightly elongated vertically so that the handle and rod 23 can be raised if desired. On the end of the rod 23 is a bell crank 26. This bell crank extends through the upper end 27 of the shift lever 28. The shift lever is provided intermediate its ends with a ball 29 which fits in a socket 30 so that the lever can be moved from side to side and forward and back. The lower end of the lever 28 is provided with a flattened portion 31 which fits in the slot 32 of the H plate 33. The H plate is also provided with grooves 34 and 35 in which one end of shifter bars 36 and 37 extend and which bars also extend into the transmission casing 39 and are provided with forks 40 and 41; the fork 40 engaging a collar 42, which collar is carried by the low speed gear 43. The fork 41 engages with a collar 44 which is carried by the intermediate gear 45. These gears are slidably mounted on a splined shaft 46. This shaft has reduced ends 47 and 48.

Carried by the forward wall of the gear housing 39 is the driving gear 49. This driving gear is provided with a hub 50 which also forms a support for the gear. This hub has projecting therefrom a shaft 51 which is splined as at 52 and which carries the member 53 of the main clutch. The gear 49 is provided with a bore 54 in which the reduced end 48 of the splined shaft 46 is supported. Projecting from the face of the gear 49 are pins 55 the purpose of which will be explained in detail later. The gear 45 has a cylindrical projection 56 formed on one face, which projection extends toward the gear 49. This cylindrical projection is provided with arcuate grooves 57 and at each end of these grooves is a bore 58. This bore preferably extends entirely through the gear, the purpose of which will be explained in detail later.

Carried by the housing 39 is a shaft 59 on which is mounted a gear 60. This gear is always in mesh with the gear 49 and through it the shaft 59 is rotated. Carried by the shaft 59 is a gear 61 and a gear 62. The gear 62 is designed to be meshed with the gear 43 for low speed and the gear 61 with the gear 45 for intermediate speed. Carried by the housing 39 is a shaft 63 on which are gears 64 and 65. The gear 64 is in constant mesh with the gear 62 and the gear 65 is designed to be brought in contact or mesh with the gear 43 for reverse drive. Carried by the rear wall of the housing 39 is a clutch member 66 which has a bore 67 formed therein in which the reduced portion 47 of the shaft 46 is supported. The clutch member 66 projects rearwardly from the casing 39 and is designed to receive the universal coupling by means of which the propeller shaft of the rear wheels is secured to the transmission. The clutch member 66 has arcuate grooves 68 formed in its face, which grooves terminate in bores 69 similar to the bores 58. Slidably mounted on the shaft 46 is a clutch member 70. This clutch member is provided with pins 71 which are designed to enter the grooves and openings 68 and 69 for the purpose of connecting the members 66 and 70. The member 66 is provided with a grooved collar 72 in which the fork 73 fits. The fork is provided with a sleeve 74 by means of which it is mounted on the clutch and operating rod 75. The clutch operating rod has formed therein notches 76 and 77 in which the ends 78 and 79 of dogs 80 and 81 fit.

The dog 81 is provided adjacent its lower end with a flange or projection 82 which acts as a support for the coil spring 83. The dog 81 is slidably mounted in a bore 84 formed in the side wall 85 of the upper portion of the housing 39. This wall also has a slot 86 therein through which the pin 87, carried by the dog 81, passes. To the rear end of the shaft 75 is attached a spring 88. This spring is secured at its opposite end to any suitable point of the automobile body or chassis and has a tendency to draw the rod backward thus moving the clutch member 70 so that the pins 71 can engage in the slots and bores 68 and 69.

Slidably carried by the housing 39 and on the outside of the wall 85 is a slide 89. This slide is provided with a projection 90 which fits in the cut-away portion 91 of the wall 85. The projection 90 is provided with a bore 92 in which the dog 80 is located. This dog is pressed downward by means of a coil spring 93. The slide 89 is also provided with a slot 94 through which the pin 95 of the dog 80 projects. Carried by the slide 89, or rather on its upper end, is an upwardly extending portion 96 which has an incline 97 leading from the upper face of the slide 89 to the upper face of the projection 90. This is for the purpose of permitting the pin 87 to ride up easily on to the face of the projection 96. A similar projection 98 is carried by the transmission housing and is for the purpose of permitting the pin 95 to ride up on the projection. The riding up of these pins onto the projections causes the dogs 81 and 80 to rise and lower. 99 represents a shaft on which the clutch pedal 100 is secured. This shaft and clutch pedal operate the forward or front clutch in a manner well known in the automobile art, and therefore, the specific construction of this clutch and its manner of operation has not been shown.

Pivotally attached to the lever 101 of the clutch pedal 100 is a rod 102. This rod has its rear end 103 bifurcated and in this bifurcation extends a lever 104. One end of this lever 104 is pivotally attached at the point 105 to the frame of the automobile. The opposite end of the lever 104 is slotted as at 106 and fits in a bifurcation 107 carried by the rear end of the slide 89. A pin 108 is passed through the bifurcation 107 and also through the slot 106. A spring 109 has one end attached to the lever 104. Its opposite end being attached in a manner similar to the spring 88. The function of this spring is to pull the lever and slide backward when the pedal 100 is released. The bifurcation 103 is also slotted as at 110. The purpose of this is to allow the front clutch to be disengaged without operating the rear clutch. This is sometimes desirable especially when driving over very rough places or when coasting and ready for a stop.

Pivotally carried by the wall 111 of the housing 39 is a lever 112 which has its end 113 pivotally secured in the bifurcation 114 formed in the upper end of the dog 81. The shifter parts 36 and 37 are provided near their rear ends with a slot 115 and in the slot are pivotally mounted dogs 116 and 117. These dogs are normally held in the position indicated by solid lines in Fig. 8 by means of a spring 118, but are so arranged that they can tilt in one direction as illustrated by the dotted line in Fig. 8. When the transmission is in neutral, the dogs are in the position illustrated in Fig. 8, but when shifted so that the transmission is active, the dogs will be at one side or the other of the lever 112.

The operation of my device is as follows:

Assuming the device to be in neutral and it is desired to shift into low speed, the engine is first started. This will drive the gear 49 and consequently place the gears carried by the shaft 59 in rotation, but on account of neither the gears 43 or 45 being in mesh with any other gear, no movement will be imparted to the vehicle itself. The next operation is to push out the front clutch. This is done by depressing the pedal 100. The forward movement of this pedal will move the rod 102 forward, bringing the rear end of the slot 110 in contact with a pin carried by the lever 104. A continued forward movement now moves the slide 89 forward, carrying with it the dog 80. The tooth 78 of this dog being in the notch 76 formed in the clutch operating rod 75 moves the rod forward carrying with it the fork 73 and consequently, the clutch member 72, thus disengaging it from the clutch. During this movement the projection 96 has left the pin 87 so that the dog 81 is now held up or supported by the rod 75. This forward movement continues until the rod 75 has brought the notch 77 into the position indicated by dotted lines in Fig. 5. This permits the tooth 79 to drop into the notch. At the same time the pin 95 rides on projection 98 and releases the dog 80. The rear clutch is now held in open position by the dog 81 and the shifting is ready to commence.

The handle 24 is turned so as to swing the lower end of the shift lever 28 over so that it will engage the notch 38 formed in the shifter part 36. The handle is then pulled toward the operator which moves the bottom end 31 of the shifter rod away from the operator exerting a forward pull on the rod 36. This in turn moves the fork 40 forward and carries with it the gear 43, causing it to mesh with the gear 62. After the gear is partly in mesh, the dog 117 carried by the shifter rod 36, passes underneath the lever 112 and in such a manner has to raise this lever. This movement raises the dog 81 and permits the spring 88 to draw the clutch operating rod 75 backward, re-engaging the rear clutch. The shift is then completed by pulling as far forward on the shifter bar 36 as it will go. The front clutch is then reengaged by allowing the pedal to come back. This releases the pull on the rod 102 and permits the spring 109 to pull the lever 104 and the slide 89 backward to their starting position, and when this position is arrived at the tooth 78 will again drop into the notch 77 and the device is ready for the next speed. This is done by first shifting the device to neutral and on account of the peculiar manner of pivoting the dogs 116 and 117, the dog 117 can ride underneath the lever 112 without operating it as it will tip into the slot as illustrated by dotted lines in Fig. 8; the dog there shown being the dog 116. When the device has been thus returned to neutral, the clutches are again disengaged, the handle turned so that the lower end 31 of the shift lever 28 will enter the notch 38 carried by the bar 37. This bar is then moved backward causing the gear 45 to mesh with the gear 61 and in so doing, the dog 116 rides beneath the lever 112 raising it and permitting the rear clutch to again engage. When shifting from second to high, the clutches are disengaged in the usual manner and the shifter part 37 moved forward as far as it will go. This permits the dog 117 carried by the bar 37, to raise the lever 112, re-engaging the rear clutch. On the forward speed the pins 55 will enter the slots 57 and ride therein until they reach one of the openings 58. This operation is the same for the rear clutch. In other words, my purpose of putting the slots in these members is, that the pins may be traveling at a fairly high rate of speed, and consequently, would not enter an opening if it were the same diameter as the pin, but in this way by permitting the pin to first enter the groove, or slot, the pins cannot pass by the openings but must become seated therein, and when once seated they fit snug so that there will be no back-lash.

It will also be noted that I have made the openings 58 and 69 so that they will extend entirely through the members in which they are formed. My purpose in doing this is that the transmission case is always filled with a very heavy oil or gear compound which would naturally enter these openings, and if the openings did not extend entirely therethrough, there would always be a possibility of the oil or gear compound filling these openings and preventing the pins from entering. But by my peculiar construction this oil or gear compound is forced out to the opposite face of the member.

I do not desire to limit myself to the precise construction of shifting mechanism disclosed because by my construction, the device will be operative with the present type of shifting lever, the only thing necessary being to add the rear clutch and its operating mechanism. Nor do I desire to limit myself to having the rear clutch enclosed in the gear casing as I may just as well add this rear clutch on the outside rear end of the transmission casing or housing without departing from the spirit of my invention. The essential feature of my invention being that both the front and rear ends of the transmission, during at least the preliminary meshing of the gears, are disconnected either from the driving or driven means. By that I mean that the transmission is neither being driven by the engine, nor is it being driven by the rear wheels during the initial meshing of the gears and that before the power from the engine is again transmitted to the transmission, the rear end of the transmission is connected to the rear wheels, but in no event does this connection to the rear wheels occur until the shifting or meshing of gears has been partially completed. In this way I obviate all possibility of stripping the gears because all the gears in the transmission rotate only by their own inertia and are not driven from either direction so that a gear shift can be made from high to low or low to high without any danger of stripping the gears.

Having fully described my invention, what I claim is:—

1. A gear shift comprising a sliding gear transmission and its housing, clutches located at the front and rear of said transmission, means for disengaging said clutches in sequence, a dog for holding said rear clutch in disengaged position, means for operating said dog for releasing said rear clutch when a shift has been partially completed, and means for returning said rear clutch to its engaged position independently of the front clutch.

2. A gear shift comprising the combination with a sliding gear transmission of a front and a rear clutch for entirely disconnecting said transmission from its driving and driven mechanism, means for disengaging said clutches in the sequence named, means for locking said rear clutch in disengaged position, means for shifting said gears to a predetermined speed and direction, said shifting means also provided with means for releasing the rear clutch locking means when the shift has been partially completed, and means for re-engaging the rear clutch automatically when the same has been released.

3. A gear shift comprising a sliding gear transmission and its housing, clutches located at the front and rear ends of said transmission, means for disengaging said clutches in sequence, a pawl for holding said rear clutch in open position, shifter bars for operating certain of said transmission gears, means for operating said shifter bars, means operated by the movement of said shifter bars for raising said pawl and releasing said rear clutch, and a spring for causing said clutch to re-engage when the pawl is released and while the front clutch is still disengaged.

4. A gear shift comprising the combination of a sliding gear transmission and means for operating the same, of a clutch located at the front of said transmission, a second clutch located to the rear of said transmission, means for disengaging said clutches in the sequence named, a pawl for holding said second mentioned clutch in operation, means carried by and operated by the transmission operating means for releasing said pawl, while said first mentioned clutch is disengaged, and a spring for returning said second mentioned clutch to its engaged position when so released.

5. A gear shift comprising the combination of a sliding gear transmission and means for operating the same, of a clutch located at the front of said transmission, a second clutch located at the rear of said transmission, means for disengaging said clutches in sequence named, a pawl for holding said rear clutch in disengaged position, means controlled by movement of the operating means for automatically raising said pawl thereby releasing said rear clutch when the shift has been partially completed, and a spring for causing the re-engagement of the rear clutch after the pawl has released the same and without reengaging the first mentioned clutch.

In testimony whereof I have affixed my signature.

JASPER BLACKBURN.